United States Patent [19]

Willette

[11] 3,866,180

[45] Feb. 11, 1975

[54] HAVING AN INSTRUCTION PIPELINE FOR CONCURRENTLY PROCESSING A PLURALITY OF INSTRUCTIONS

[75] Inventor: E. Leon Willette, San Jose, Calif.

[73] Assignee: Amdahl Corporation, Sunnyvale, Calif.

[22] Filed: Apr. 2, 1973

[21] Appl. No.: 347,211

[52] U.S. Cl. .............................................. 340/172.5
[51] Int. Cl. .............................................. G06f 13/00
[58] Field of Search ......... 340/172.5, 173 R, 174 R; 307/238; 179/15 A, 15 AQ, 15 BA

[56] References Cited

UNITED STATES PATENTS

| | | | |
|---|---|---|---|
| 3,560,940 | 2/1971 | Gaensslen | 340/173 |
| 3,564,517 | 2/1971 | McLean et al. | 340/174 |
| 3,609,665 | 9/1971 | Krunies | 340/172.5 |
| 3,623,022 | 11/1971 | Day | 340/172.5 |
| 3,631,406 | 12/1971 | Kurner | 340/172.5 |
| 3,691,534 | 9/1972 | Varapi | 340/173 R |
| 3,728,691 | 4/1973 | Stevenson | 340/172.5 |

OTHER PUBLICATIONS

IBM Technical Disclosure Bulletin, "Multiple Use of a Read-Only Storage Matrix by Time Division Multiplexing Techniques," P. J. Brown & A. J. Scriver, Vol. 9, No. 8, Jan. 1967, p. 988.

*Primary Examiner*—Gareth D. Shaw
*Assistant Examiner*—James D. Thomas
*Attorney, Agent, or Firm*—Flehr, Hohbach, Test, Albritton & Herbert

[57] ABSTRACT

Disclosed is a memory system within a digital data processing system. The memory system includes large scale integrated semi-conductor chips which are arrayed on chip cards. The chips on a card are interleaved on a time basis to enable underlapping of cycles in order to access information from the chips at a higher rate than otherwise possible. Additionally, information is accessed from groups of cards on a time-multiplexed basis. Further, for a two-megabyte system, interleaving is carried out using an odd array and an even array of cards with four-way time multiplexing from cards in each array and two-way interleaving of odd and even array cards.

16 Claims, 11 Drawing Figures

HAVING AN INSTRUCTION PIPELINE FOR CONCURRENTLY PROCESSING A PLURALITY OF INSTRUCTIONS

CROSS REFERENCE TO RELATED APPLICATIONS,

1. DATA PROCESSING SYSTEM, Ser. No. 302,221, filed Oct. 30, 1972, invented by Glenn D. Grant, Robert M. Maier and Gene M. Amdahl, assigned to Amdahl Corporation, now U.S. Pat. No. 3,840,861.

2. DATA PROCESSING SYSTEM AND METHOD THEREFOR, Ser. No. 302,229, filed Oct. 30, 1972, invented by Gene M. Amdahl and Richard J. Tobias, assigned to Amdahl Corporation.

3. CLOCK APPARATUS AND DATA PROCESSING SYSTEM, Ser. No. 302,222, filed Oct. 30, 1972, invented by Glenn D. Grant, assigned to Amdahl Corporation, now U.S. Pat. No. 3,792,362.

BACKGROUND OF THE INVENTION

The present invention relates to the field of data processing systems and specifically to the memory systems within the hierarchy of the data processing system.

Memory systems, frequently including main stores and buffer stores, function to store the information which is employed by the system in the processing of information. A memory system may be constructed physically integrated with the remainder of the system or as a stand-alone unit. The memory accessing cycle time is typically different than the processing cycle time.

A general objective is to have high capacity storage with a fast cycle time. The cost of storage, however, has generally dictated that the main store operate at a slower speed than the high speed circuitry of the system processing units. Many techniques have been employed to enhance the apparent speed of the memory system. One approach employs a low-capacity, high-speed buffer store in combination with the high-capacity, low-speed main store. The buffer memory interacts between the main store and the processing units of the system to enhance the information transfer rate. The cost-per-bit of the buffer store is higher than in the main store. The combination buffer and main store system appears to operate at an information transfer rate which is greater than the slower rate of the main store and less than the faster rate of the buffer store. Since the buffer store has a small capacity compared with the main store, the processing units frequently address information which cannot be accessed directly from the buffer store but must be first accessed from the main store. Various replacement algorithms have been generated for determining when information is to be transferred from the main store to the buffer store and vice versa in order to optimize the information transfer from storage to the processing units.

In designing an efficient memory system, the capacity of the main store, the capacity of the buffer store, the size of transfers between buffer and main store, the algorithms for determining replacement of information in the buffer store, the cycle times of the main store, of the buffer store, of the processing units, and the type of storage cell are all variables which must be considered in designing an efficient data processing system.

Recent prior art memory systems, particularly for high-speed data processing systems, have employed monolithic semi-conductor storage cells as an improvement over core storage cells. Particularly, memories have been constructed using metal oxide silicon (MOS) using large scale integration (LSI). Large scale integration generally permits higher operating speeds, lower cost and higher packing density. In order to take advantage of these desirable features, there is a need for improved random-access memory systems.

SUMMARY OF THE INVENTION

The present invention is a memory system and method of operation within a data processing system. The memory system is constructed using semiconductor chips which each include a plurality of storage locations. Each chip further includes addressing means and accessing means for addressing and accessing the storage locations. The chips are cyclically accessed, either to fetch or store data. Each cycle includes an active period during which the storage locations may be accessed and an inactive period during which the storage locations may not be accessed. The chips are organized into a first array and a second array. During the active period of the chips in the first array, the chips in the second array are in their inactive period, and similarly during the inactive period of the chips in the first array the chips in the second array are in their active period. With this underlapped operation, the chips are accessed at a higher effective rate.

In one preferred embodiment of the invention, the data access means of the chips in the first array and the second array are connected in common forming shared data outputs. Similarly, the addressing means for chips in the first array and chips in the second array are connected in common forming shared inputs.

In one preferred embodiment, chips are physically supported on cards where each card includes first and second arrays of chips. A plurality of cards are further organized into a logical array where a logical array includes first and second logic modules. An odd logical array and an even logical array form a complete memory array of four logic modules. Information is accessed from groups of cards in one array at a time, on a time-multiplexed basis. Interleaving is carried out between the odd and even arrays with four-way time-multiplexing from cards in each array and two-way interleaving of odd and even array cards.

In a detailed embodiment of the present invention, the chips are constructed with metal oxide silicon (MOS), large scale integrated (LSI) semi-conductor technology where the inactive period is the recharge time and the active period is the access time.

In accordance with the above summary of the invention, the objective of providing an improved semiconductor memory having high-speed operation is achieved.

The foregoing and other objects, features and advantages of the invention will be apparent from the following more particular descriptions of preferred embodiments of the invention, as illustrated in the accompanying drawings.

DETAILED DESCRIPTION

Figure 1:
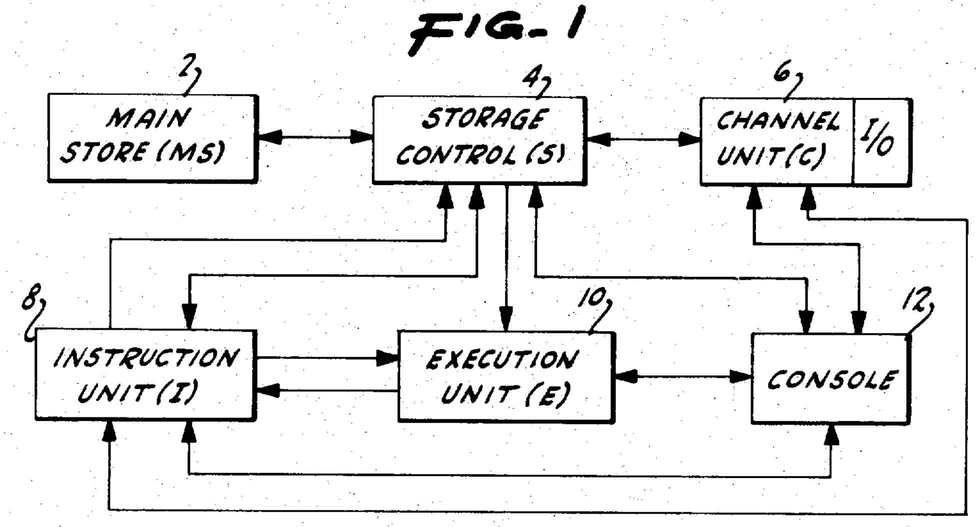
FIG. 1 depicts a block diagram of the overall data processing system which incorporates the present invention.

Overall System (FIG. 1)

In FIG. 1, the data processing system of the present invention is shown to include a main store 2, a storage control unit 4, an instruction unit 8, an execution unit 10, a channel unit 6 with associated I/O and a console unit 12. The system of FIG. 1 is operated under control of system instructions where an organized group of those instructions forms a system program. System instructions and the data upon which the instructions operate are introduced from I/O equipment via the channel 6 through the storage control unit 4 into the main store 2. From the main store 2, system instructions and data are fetched by the instruction unit 8 through the storage control unit 4 and are processed so as to control the execution within the execution unit 10. The system of FIG. 1 is described in more detail in the above-referenced application entitled DATA PROCESSING SYSTEM which description is hereby incorporated by reference in the present specification for the purpose of teaching the overall general operation of a suitable instruction-controlled data processing system.

In addition to the above-referenced patent specifications, the publication "IBM System/370 Principles of Operation" SRL GA22-7000-2 published by IBM Corporation, copyright 1972, is hereby incorporated by reference for the purpose of further teaching the general details of a data processing system compatible with the overall system which incorporates the present invention.

Figure 2:
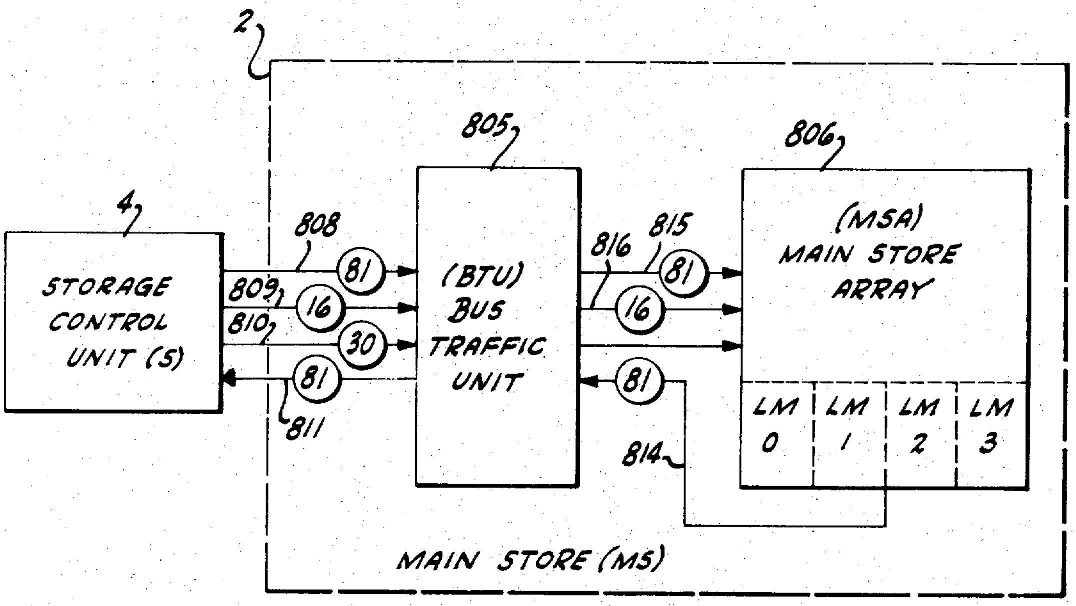
FIG. 2 depicts a schematic representation of the memory system and the manner in which it interconnects with the storage control unit of the FIG. 1 system.

Referring to FIG. 2, the storage control unit 4 is connected to the main store 2 by an 81-bit data bus 808, a 16-bit address bus 809 and a 30-bit control bus 810. Data is returned from the main store 2 to the storage control unit 4 via a data bus 811.

Main Store Overall (FIG. 2)

The main store 2 is further organized into a main store array (MSA) 806 and a bus traffic unit (BTU) 805. The main store array 806 is further divided into logic modules identified an LMO, LM1, LM2 and LM3. In a typical embodiment of main store 2, each of the logic modules represents 512 K-bytes of storage.

Information is transferred between the storage control unit 4 and main store 2 through buses 808 through 811. Bus 808 includes 81 bits of data and related information, bus 809 includes 16 address bits, bus 810 includes 30 bits of control information, and bus 811 returns 81 bits of data and related information. The bus traffic unit (BTU) 805 transmits the 81 bits on bus 808 as an input on 81-bit bus 815 to the main storage array (MSA) 806. The array 806 returns 81 bits of information on bus 814 to the bus traffic unit 805 which in turn transmits that information on output bus 811 to storage control unit 4.

Figure 3:
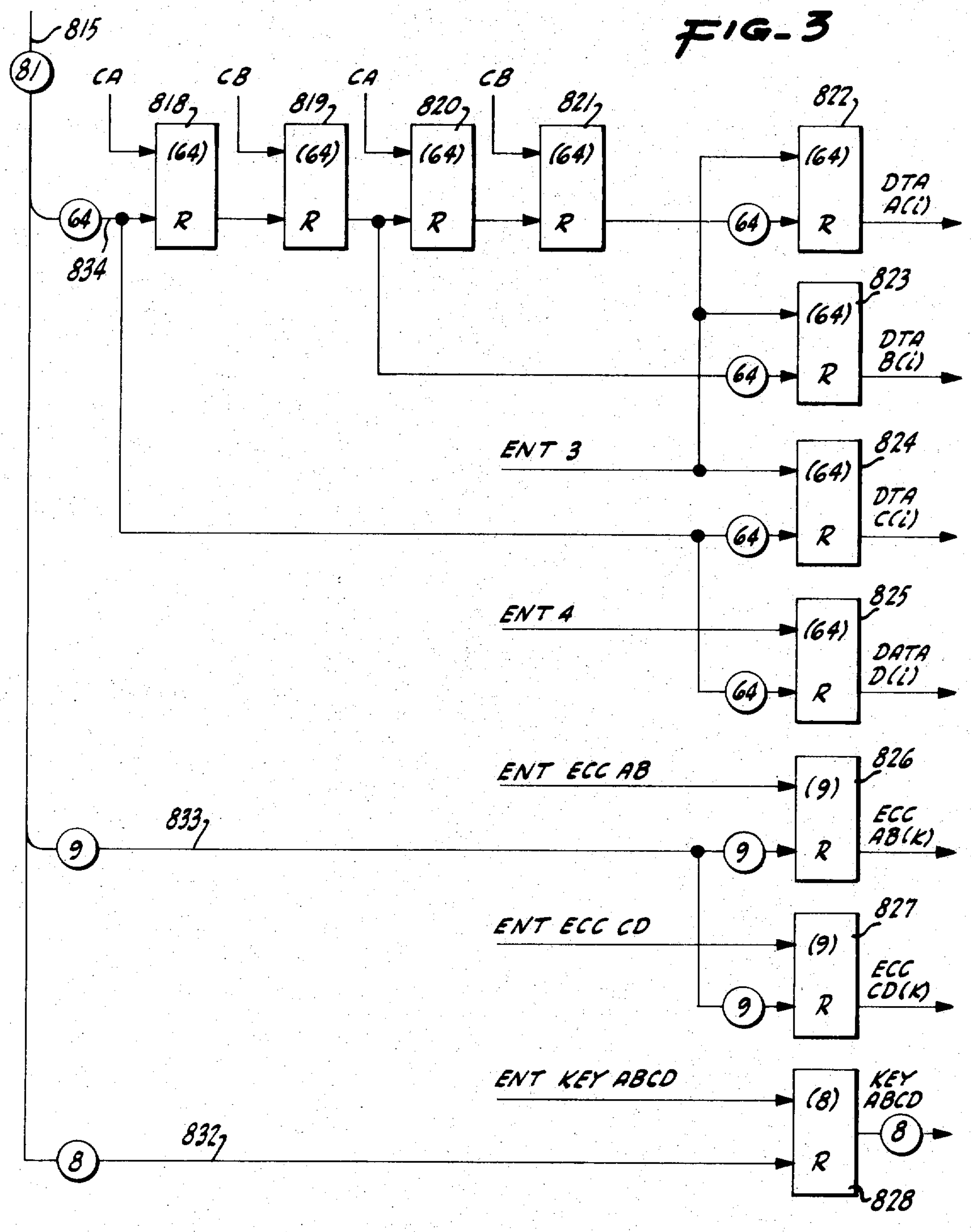
FIG. 3 depicts a block diagram representation of the write pipeline and registers for storing information in the memory arrays of FIG. 4.

Write Circuitry (FIG. 3)

The 81 bits of input information on bus 815 are stored in registers of the main store array 806 as shown in FIG. 3. The 8 key bits are connected on 8-bit bus 832 to 8-bit register 828 and are latched at ENT KEY ABCD time. The 9 error correction bits are connected on bus 833 as an input to the two 9-bit registers 826 and 827 which are latched at ENT ECC AB and ENT ECC CD times, respectively. The 64 bits of data in bus 815 are connected via 64-bit bus 834 as an input to the 64-bit pipeline registers 818 through 821 which latch and step the data input on bus 34 in response to clock signals CA and CB. After 4 successive clock pulses, different data from bus 834 is stored in the 4 registers 822 through 825. Each of the registers 822 through 825 is 64 bits wide. Registers 822 through 824 are latched at ENT 3 time and register 825 at ENT 4 time.

Register 822 has the 64 outputs DTA A($i$), register 823 has outputs DTA B($i$), register 824 has outputs DTA C($i$), and register 825 has outputs DTA D($i$) where "$i$"equals 0, 1, . . . , 63.

In a similar manner the 9-bit register 826 includes the outputs ECC AB($k$) and the 9-bit register 827 includes the outputs ECC CD($k$) where "$k$"equals, 0, 1, . . . , 8. The 8-bit register 828 has the 8 outputs KEY ABCD.

Each of the registers 818 through 828 in FIG. 3 is conventional in design and functions to latch the input information in response to timing signals. The details of latch circuits suitable for use as registers in FIG. 3 are shown and described in the above-identified application CLOCK APPARATUS AND DATA PROCESSING SYSTEM invented by Glen D. Grant. The outputs from the registers of FIG. 3 are input to the memory array cards of FIG. 4.

Figure 4:
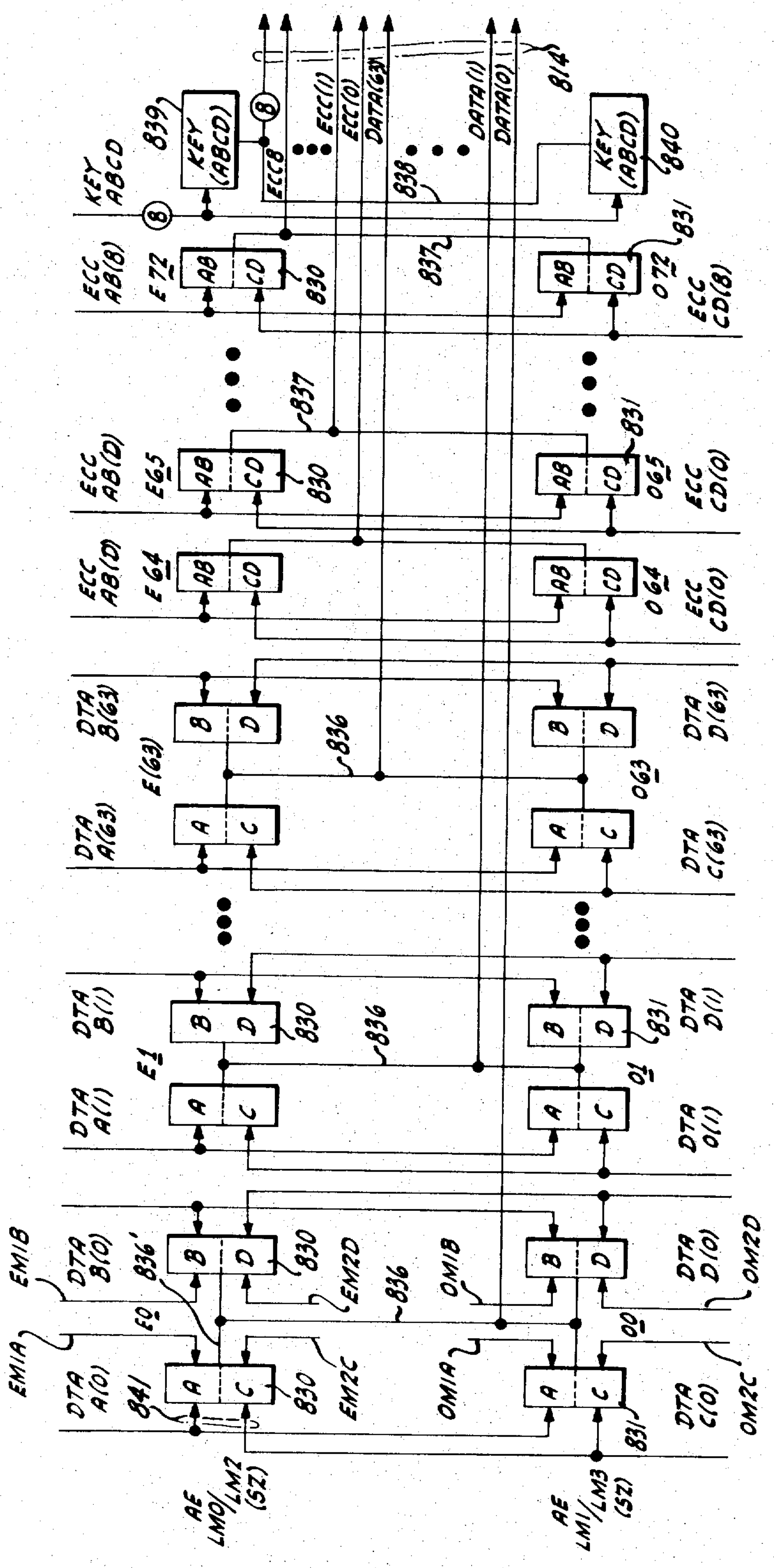
FIG. 4 depicts a block diagram of the even and odd logical arrays each formed from a plurality of cards containing semi-conductor chips.

Memory Arrays (FIG. 4)

Referring to FIG. 4, the memory even array cards 830 are arrayed in pairs for each of the 64 data bits E0, E1, . . . , E63. In a similar manner, the odd array cards 831 are arrayed in pairs for each of the 64 data bits O0, O1, . . . , O63. Each pair of cards is organized with one card designated A/C and the other B/D. Each one of the letters A, B, C, and D represents the data positions on one-half of a card. Each card includes 64 semiconductor chips per card where each chip includes 1,024 storage locations for 1,024 bits of information.

As indicated in FIG. 4, each of the cards 830 and 831 includes 2 data input lines. For example, the E0 A/C card includes a DTA A(0) input to the A ½ of the card and a DTA C(0) input to the C ½ of the card. The O0 A/C card 831 includes the same two data inputs as the E0 A/C card, and the O0 B/D card has the same data inputs as the E0 B/D card. In a manner analogous to the odd and even "0" positions of the array of FIG. 4, the E1 and O1 positions receive the DTA A(1), DTA B(1), DTA C(1), and DTA D(1) inputs. Each of the other data positions 2, 3, . . . , 63 receives the appropriate corresponding data inputs. Specifically, the last data positions E63 and O63 receive the data inputs DTA A(63), DTA B(63), DTA C(63), and DTA D(63).

In addition to the 64 bits of data, the even and odd arrays of FIG. 4 include the 9 cards for error-correcting locations E64 through E72 and O64 through O72, respectively. The bit positions 64 through 72 for both the even and odd error-correcting codes are associated with the A and B or the C and D ½ cards for data positions 0 through 63. Each ½ error-correcting card, either AB or CD, receives one error-correcting input from the respective registers 826 and 827 of FIG. 3. Specifically, the E64 AB ½ card receives the input ECC AB(0) as does the ½ card AB for O64. Similarly, each of the other ½ cards AB and CD receives the appropriate inputs as indicated in FIG. 4.

Referring to FIGS. 3 and 4, the output from register 822 in FIG. 3 designated as DTA A($i$) represents the 64 input data lines designated in FIG. 4 as DTA A(0), DTA A(1), . . . , DTA A(63). Similarly, the DTA B($i$) outputs from register 823 are the 64 data input lines DTA B(0) through DTA B(63) in FIG. 4. In the manner indicated, the outputs DTA C($i$), DTA D($i$), ECC AB($k$), ECC CD($k$), and KEY ABCD, each find their corresponding counterpart in the array of FIG. 4.

Each of the four cards in a data position in the 0 through 63 data positions of the odd and even arrays of FIG. 4 has a single common output line 836. Those 64 lines form the 64 data outputs DATA(0), DATA(1), . . . , DATA(63). Similarly, each of the error-correcting cards for the odd and even positions 64 through 72 has an output line 837 which form the error-correcting outputs ECC(1) through ECC(8), respectively. The key bits have the 8 outputs 838. The DATA(0) through DATA(63) and ECC(0) through ECC(8) constitute 73 of the 81 bits of bus 814 and the other 8 bits are derived from key bit cards 839 and 840.

Figure 5:
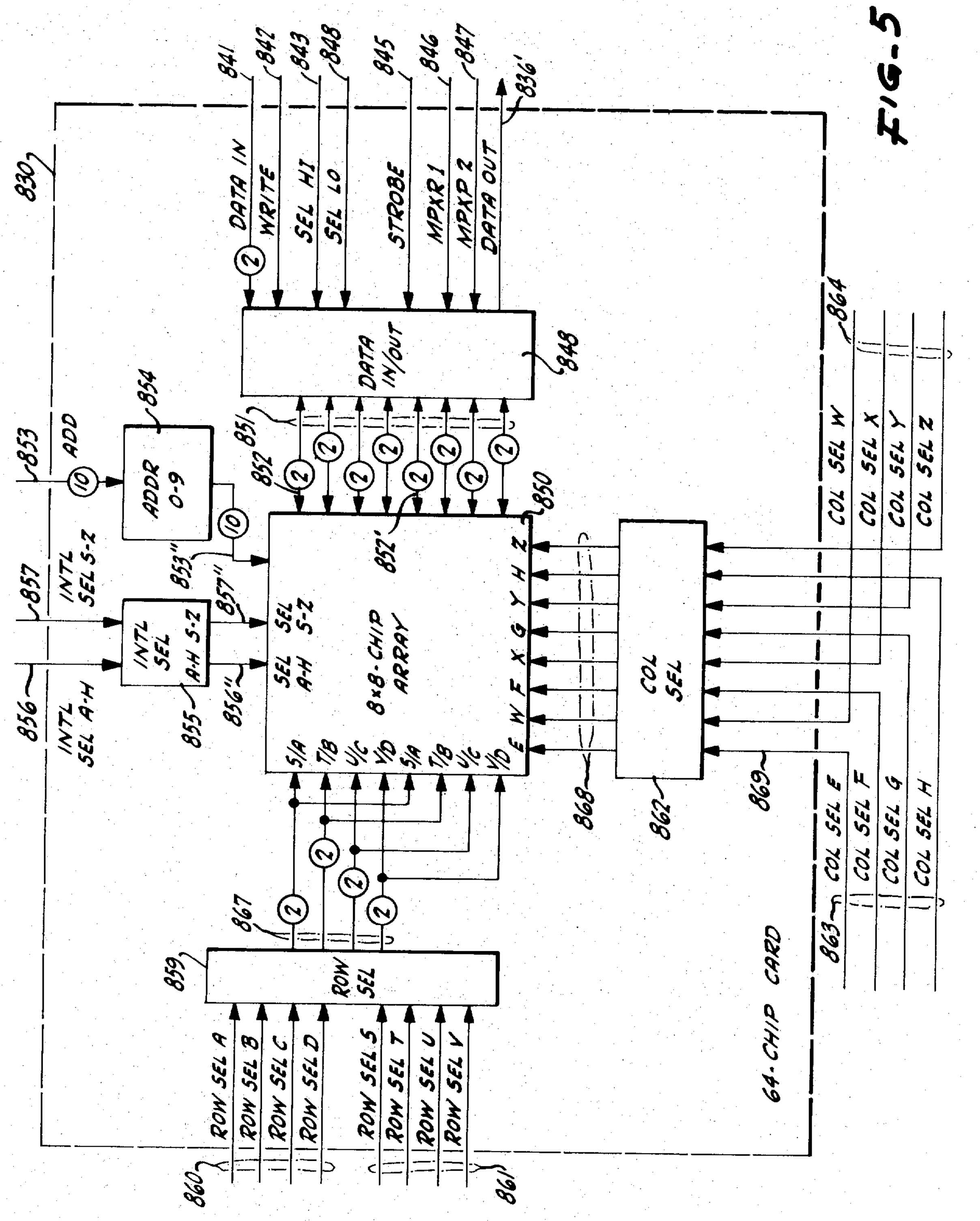
FIG. 5 depicts a block diagram of one card typical of the cards employed in the arrays of FIG. 4.

Memory Array Card (FIG. 5)

Referring to FIG. 5, a typical one of the cards 830 or 831 in FIG. 4 is shown in further detail. For example, the card 830 in the even array position E0 is typical. Card 830 includes the two input data bits on lines 841 in FIG. 5 which correspond to DTA A(0) and DTA C(0) for the E0 position in FIG. 4. The output from the card 830 is line 836'. Although not shown in FIG. 4, each of the cards 830 and 831 has the additional inputs shown in FIG. 5. The data in lines 841 and the data out line 836 connect to data in/out circuitry 848 shown in more detail hereinafter in connection with FIG. 7. In FIG. 5, the circuitry 848 additionally receives the inputs WRITE, SEL HI, SEL LO, STROBE, MPXR1, MPXR2 on lines 842 through 846, respectively.

The card 830 in addition to the circuitry 848 includes an 8-by-8 chip array 850 which includes 64 semiconductor chips described hereinafter in connection with FIG. 7. The chip array 850 receives the 8 pairs of data lines 851 from the data in/out circuitry 848. Data on the lines 851 is received from or transmitted over the data in lines 841 or the data out line 836' under control of the signals on the lines 842 through 847 and the other inputs to the card 830 in FIG. 5.

Each chip on the 8-by-8 array 850 contains a plurality of storage locations (e.g. 1,024) addressed and selected by ten on chip address bits which are input to the array 850 via the 10-bit bus 853 and powering gates 854. Each chip in the array receives the 10 address bits via lines 853''.

The chips on the array 850 are divided into an A–H group and an S–Z group. The A–H group is selected by the line 856 designated INTL SEL A–H and the other half are selected by the lines 857 designated INTL SEL S–Z.

Figure 6:
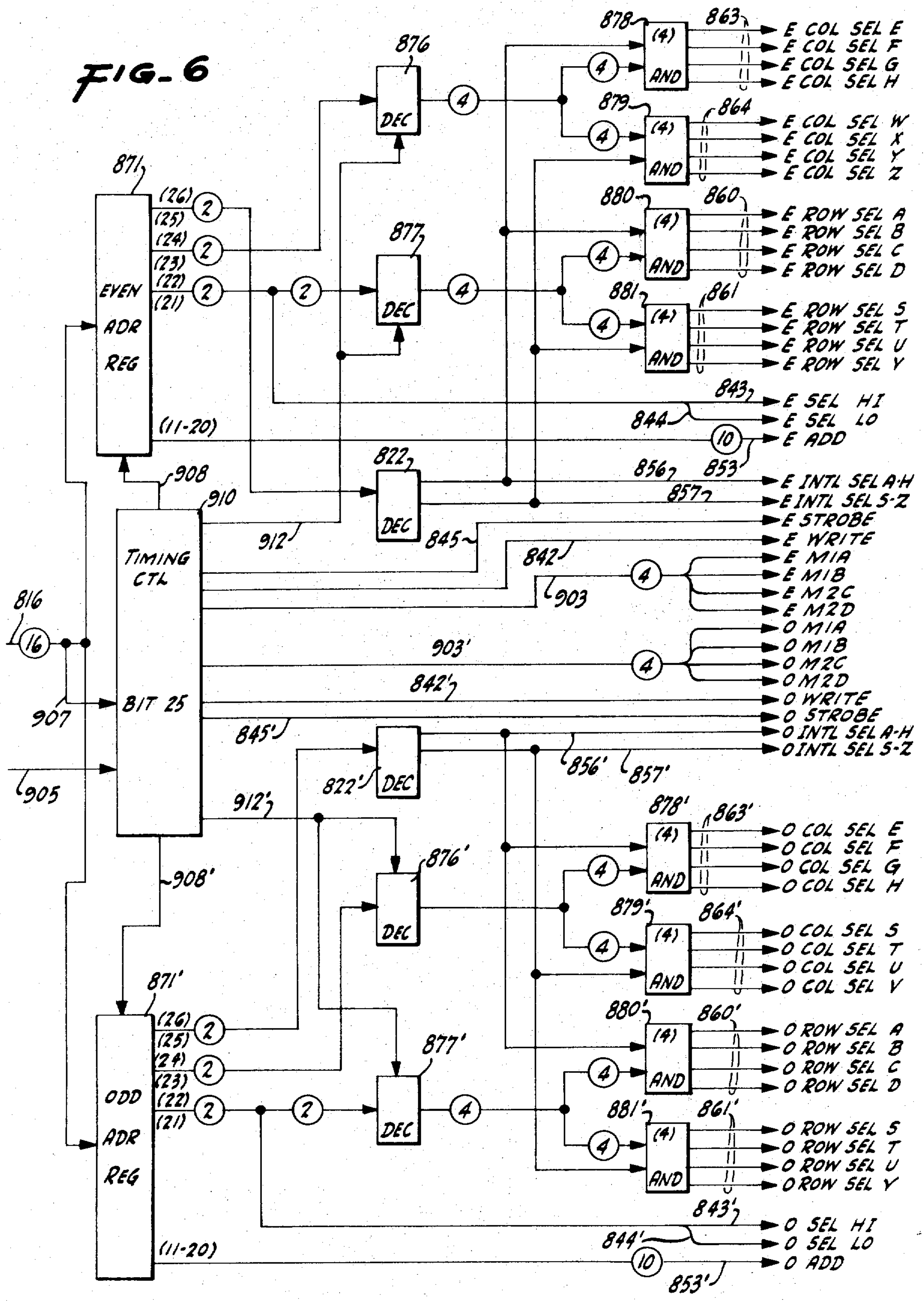
FIG. 6 depicts a schematic representation of the addressing circuitry employed to address the arrays of FIG. 4.

In addition to being organized into the groups A through H and S through Z, the chips on the array 850 are organized into rows ABCD and rows STUV for each half of the array 850 as described further in connection with FIG. 6.

The rows of chips in the 8×8 array 850 are selected by energization of the ROW SEL lines 860 and 861 input to the card 850 of FIG. 5. The select lines 860 include the four signal lines ROW SEL A, ROW SEL B, ROW SEL C, and ROW SEL D. Similarly, the select lines 861, include the four signal lines ROW SEL S, ROW SEL T, ROW SEL U, and ROW SEL V. Those lines 860 and 861 connect directly through the gates 859, which function to power the signals on lines 860 and 861, to produce the identical signals on output lines 867 which are in turn duplicated and connected as inputs to the array 850 twice, once for the top-half of the array and once for the bottom-half of the array.

The card 830 of FIG. 5 further includes the four column selection input lines 863 and the four column selection input lines 864. Selection lines 863 carry the signals COL SEL E, COL SEL F, COL SEL G, and COL SEL H. Similarly, the selection lines 864 carry the signals COL SEL W, COL SEL X, COL SEL Y, and COL SEL Z. The column selection lines 863 and 864 connect directly through the column selection gates 862, which function to power the signals on lines 863 and 864, to provide the eight input column lines 868 connected to the array 850.

The card 830 of FIG. 5 is typical of all the data cards of FIG. 4. As previously explained in connection with FIG. 4, the data cards are either in the even array (comprising cards 830) or in the odd array (comprising cards 831). The selection lines to each card consist of the interleave select lines 856 and 857, the row select lines 860 and 861, and the column select lines 863 and 864 lines. Those selection lines in FIG. 4 exist for every card in the even array and a duplicate set exists for every card in the odd array. In a similar manner, duplicate sets of the ten address lines, indicated by lines 853 in FIG. 5, the SEL HI and SEL LO lines 843 and 844 exist for the even array in FIG. 4 and for the odd array in FIG. 4. The generation of those selection, address and other lines is described in connection with FIG. 6.

Address Circuitry (FIG. 6)

Referring to FIG. 6, the address bus 816 from the bus traffic unit 805 of FIG. 2 is connected as an input to the even address register 871 and to the odd adress register 871'. Bus 861 contains the 16 address bits 11 through 26 for addressing locations within the memory arrays of FIG. 4. The 10 bits 11 through 20 are the low order address bits which address a particular one of 1,024-bit locations on a card. The low order bits 11 through 20 are connected as inputs to each data card 830 in the even array by the 10-bit address bus E ADD 853 output from the even address register 871. In a similar manner, when the odd array of FIG. 4 is selected, the 10 bits 11 through 20 are connected to each card 831 in the odd array of FIG. 4 as an output from the odd address register 871' on the 10-bit O ADD bus 853'. In general in connection with FIG. 6, the unprimed numbers are associated with the even array circuitry and the primed numbers identify the identical odd array circuitry.

Bits 21 and 22 from the even address register 871 connect out directly on lines 843 and 844, respectively, to produce the signals E SEL HI and E SEL LO, respectively. Those lines are used in connection with the reading out of the data lines by the data in/out circuitry for each chip as described in connection with FIG. 8.

Bits 21 and 22 also are connected as an input to the decoder 877 in FIG. 6 where they are decoded to select one or four output lines which are OR'ed as inputs to the four 2-way AND gates 880 and the four 2-way AND gates 881. The selection of the AND gates 880 or 881 is under control of the output from the decoder 882.

Decoder 882 receives the high order bits 25 and 26 from the address register 871 and determines whether logic module 0 or 2 is selected. The logic modules are identified as LM0, LM1, LM2, and LM3 where the even array in FIG. 4 comprises LM0 and LM2 and the odd array in FIG. 4 comprises LM1 and LM3. When bits 25 and 26 are decoded to signify LM0, then the AND gates 880 are selected and when LM2 is decoded, AND gates 881 are selected. Gates 880 produce the row select lines E ROW SEL A, E ROW SEL B, E ROW SEL C, and E ROW SEL D. Similarly the gates 881 produce the four signals E ROW SEL S, E ROW SEL T, E ROW SEL U, and E ROW SEL V.

The column select lines are generated by a decode of bits 23 and 24 from the address register 871. Bits 23 and 24 are connected as inputs to decoder 876 which produces four outputs which are OR'ed to form duplicate inputs to the AND gates 878 and the AND gates 879. Gates 878 are selected in response to a LM0 selection by decoder 882 and gates 879 are selected in response to an LM2 selection by decoder 882. Gates 878 produce the output lines 863 designated as E COL SEL E, E COL SEL F, E COL SEL G, and E COL SEL H. Similarly gates 879 produce the outputs 864 designated as E COL SEL W, E COL SEL X, E COL SEL Y, and E COL SEL Z.

The decoder 882 in selecting LM0 and LM2 energizes lines 856 or 857 respectively, and produces the E INTL SEL A–H and E INTL SEL S–Z outputs, respectively.

The decoder 882' receives the address bits 25 and 26 from the odd address register 871' and functions to select either logic module LM1 by energization of line 856' or logic module LM3 by energization of line 857'. Line 856' carries the signal O INTL SEL A–H and line 857' carries the signal O INTL SEL S–Z.

The selection of whether an address on input bus 816 is latched in the even address register 871 or the odd address register 871' is determined by the bit 25 signal on line 816 via the line 907 input to the timing control 910. If the address is even, timing control 910 via line 908 latches the full 16 address bits into the register 871 and if the address is odd, line 908' latches the full 16 bits into the odd address register 871'.

While the generation of the even address and selection signals in FIG. 6 has been specified in detail, analogous circuitry exists for the odd address and selection generation as identified by the primed numbers. The outputs from the FIG. 6 circuitry are connected to all of the data cards in the odd and even arrays of FIG. 4 in the manner shown in connection with a typical card in FIG. 5.

Figure 7:
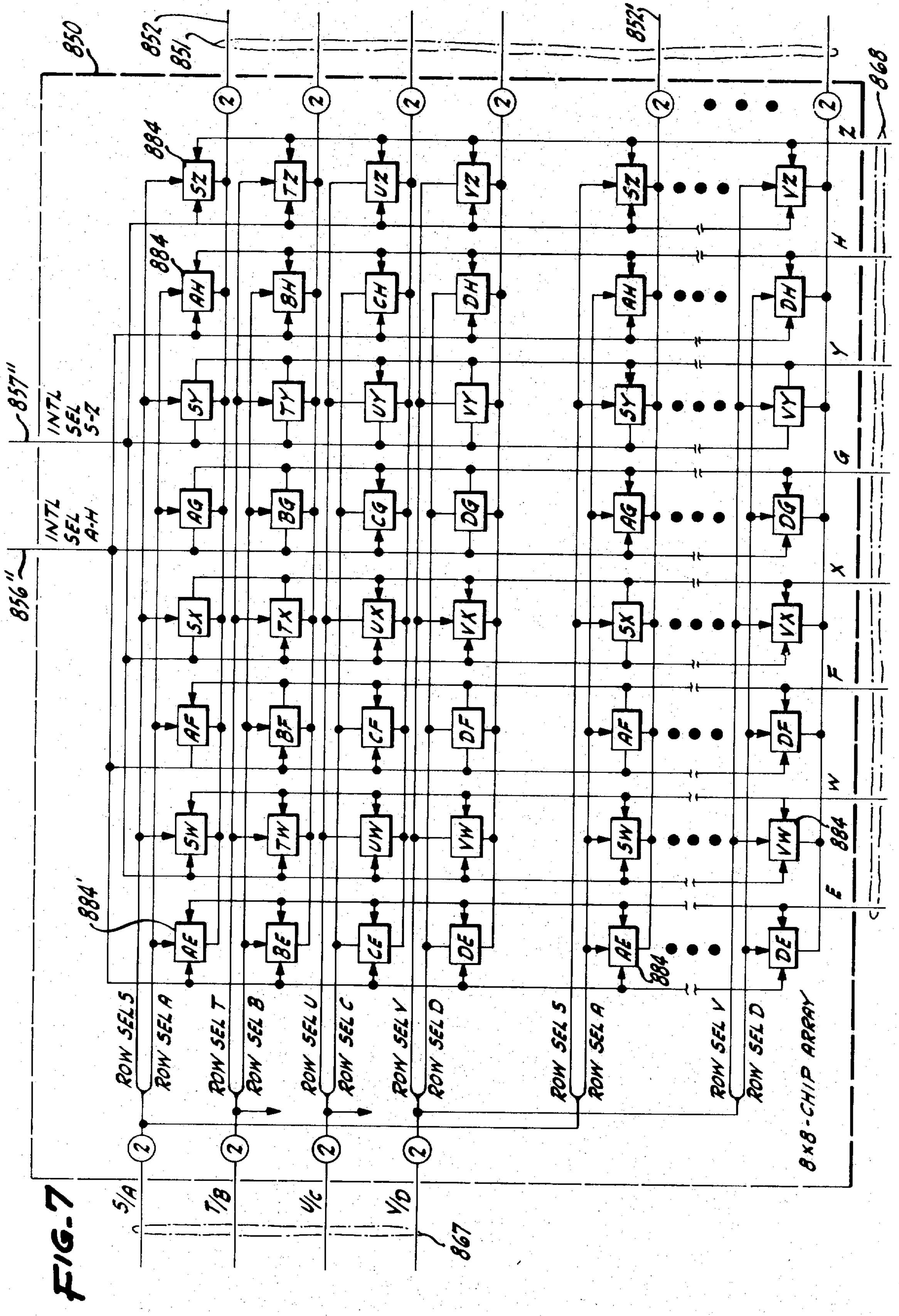
FIG. 7 depicts a block diagram representation of the 64 semi-conductor chips arrayed to form the 8×8 chip array of the card in FIG. 5.

Chip Array (FIG. 7)

Referring to FIG. 7, the 8×8 chip array 850 of FIG. 5 is shown in further detail. The interleave select lines 856'' and 857'', the row select lines 867, the column select lines 868 and the data input/output lines 851 are identical to those indicated in FIG. 5. If the array of FIG. 7 is assumed, for purpose of explanation, to be in the even array of FIG. 4 then the select lines are derived from the even select (prefixed with an E) lines of FIG. 6. If the array of FIG. 7 is associated with an odd card in the odd array of FIG. 4, the select lines are generated from the odd select lines (prefixed by an O) in FIG. 6.

The array of FIG. 7 is comprised of 64 large scale integrated semi-conductor chips 884. The chips 884 are typically like those manufactured and sold by Advanced Memory Systems, Inc. of Sunnyvale, California and designated as their product AMS-6002. Further details of such a chip are described hereinafter in connection with FIG. 9.

Still referring to FIG. 7, the 64 chips in the array 850 are organized in rows and columns where each chip is designated by two letters. The first letter in each chip designation, for example A for chip 884', designates a row. The second letter in each chip designation, for example E in chip 884', designates a column. It is apparent from FIG. 7 that 64 chips are organized into eight columns designated E, W, F, X, G, Y, H and Z. The chips are further divided into rows where the four rows at the top are identical to the four rows at the bottom. The top four rows are further subdivided into logical groups, called logical rows, consisting of the four logical rows A, B, C and D and the four logical rows S, T, U and V. The logical row S in the upper half of the array of FIG. 7, for example, includes the chips SW, SX, SY and SZ. The logical row A similarly includes the chips AE, AF, AG, and AH. The interleave select line INTL SEL A–H connects as an input to all chips in the rows A, B, C and D while the INTL SEL S–Z line connects to all chips in the rows S, T, U and V.

The data lines 851 are organized on a row basis. For example, one pair of data lines 852 is connected in common to each chip in the logical A row and the logical S row in the upper half of FIG. 7. Similarly there is a corresponding pair of data lines input to and output from each of the chips in the rows B and T, in the rows C and U, and in the rows D and V all as shown in the upper half of the chips of FIG. 7. In a similar manner there are four additional pairs of data lines associated with the four rows of chips in the bottom half of the array of FIG. 7. The eight pairs of data lines are collectively represented by the lines 851 where lines 852 are the lines which connect to the A and S logical rows in the upper half of the FIG. 7 array and the lines 852' are the lines which connect to the A and S logical rows in the bottom half of the FIG. 7 array.

The selection lines 856'', 857'', and 867 and 868 in FIG. 7 are those previously described in connection with the selection circuitry of FIG. 6. If the array of FIG. 7 is on a card in the odd array of FIG. 4 then the odd selection lines are employed and if an even array then the even selection lines are employed. The odd and even address lines 853 and 853' which connect 10 bits to every chip in the FIG. 7 array are not explicitly shown in FIG. 7. While not shown, however, each of the 64 chips in the FIG. 7 array receives 10 address bits as an additional input. If the array of FIG. 7 is on the card in the even array of FIG. 4 then the 10 address bits are received from the lines 853 of FIG. 6. If the array of FIG. 7 is on a card in the odd array of FIG. 4, then the 10 address bits for each chip received from the address bus 853' of FIG. 6. The data lines 851 of FIG. 7 are connected in a manner described further with reference to the data in/out circuitry 848 in FIG. 8.

Figure 8:
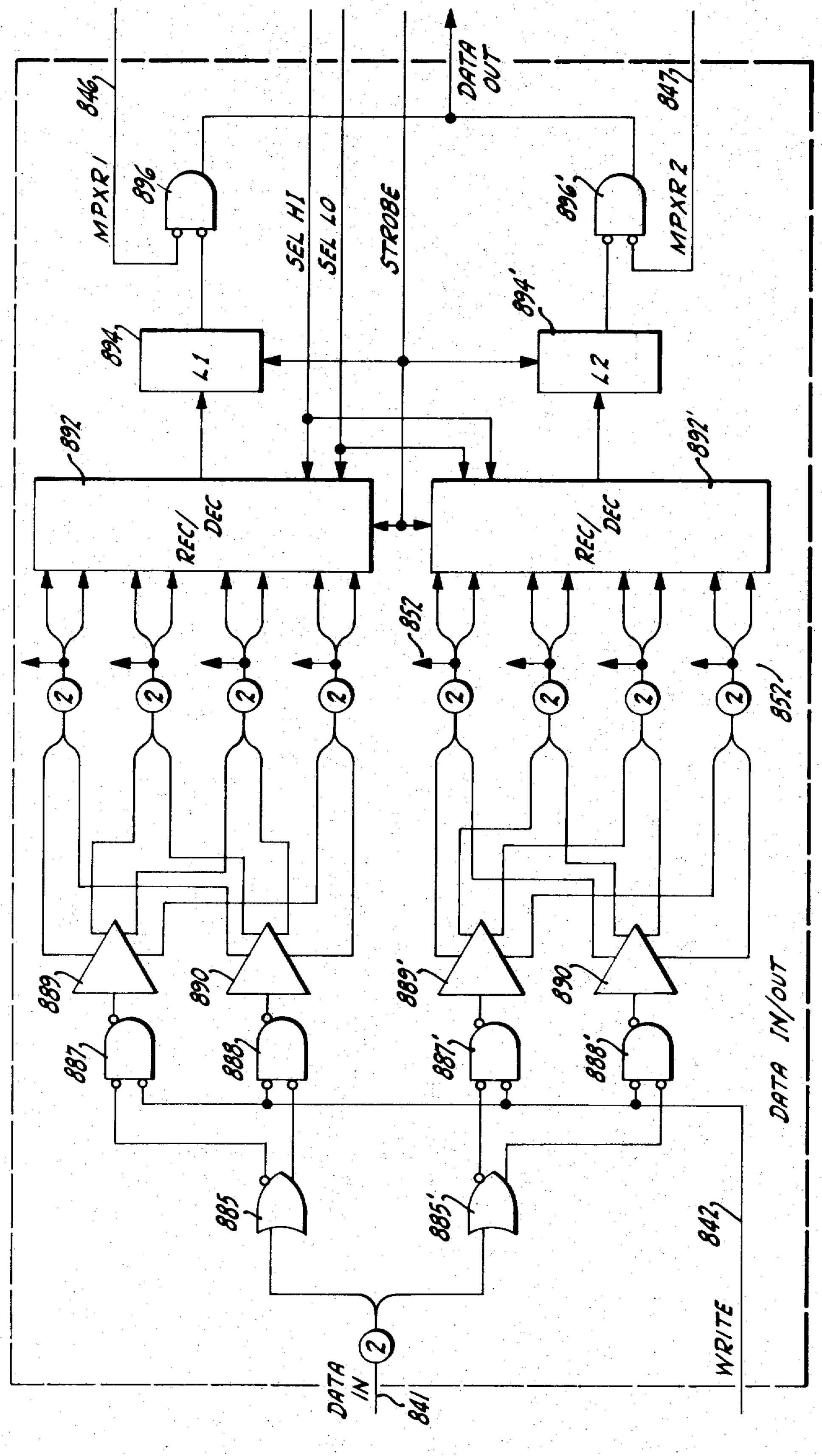
FIG. 8 depicts a schematic representation of the data in/out logic of the FIG. 5 card.

Data In/Out Circuitry (FIG. 8)

In FIG. 8, the input/output lines 851 are derived from the array 850 and connect to the data in/out circuitry 848 in the manner shown in both FIGS. 5 and 7. When the lines 851 are functioning as data inputs, the information communicated for writing into the array 850 of FIG. 7 is derived from the 2-bit data in bus 841. Bus 841 has one of its two lines connected to gate 885 and the other to gate 885'. Gates 885 and 885' have complementing outputs which connect, respectively by primes, to gates 887 and 888 and 887' and 888'. The gates 887 and 888 and their respective primes, are operative to gate the data input on lines 841 whenever a WRITE signal appears on line 842. The complementary signals for one bit of data is transmitted via gates 887 and 888 into amplifiers 889 and 890. The unprimed numbers of FIG. 8 are associated with the upper half of the array of FIG. 7 while the primed numbers of FIG. 8 are associated with the lower half of FIG. 7. One of the two bits of data from the input line 841 are associated with the upper half of FIG. 7 (unprimed numbers) while the other bit from bus 841 is associated with the lower half of FIG. 7 (primed numbers). Gates 887 and 888 connect the complements of the same bit of information from complementing gate 885. Amplifiers 889 and 890 drive the signals, in complementary form, to each of the four pairs of lines 852, 852-1, 852-2, and 852-3. The pairs of lines 852 convey the 1-bit of data from the line input to gate 885 along all of the data lines in the upper half of the array. In a similar manner, the primed numbers convey the input data from the gate 885' to the four rows in the lower half of the array of FIG. 7. When the chips in the array 850 are appropriately selected by address and select lines discussed in connection with FIG. 6, the data on lines 852 is written in the appropriate bit location.

Still referring to FIG. 8, when the data is being accessed from the array of FIG. 7, the lines 851 supply inputs to the receiver/decoder circuit 892 for the upper half of the FIG. 7 array and 892' for the lower half of the FIG. 7 array. The data on the lines 852 is selected by a decode of the 2 bits on lines 843 and 844. Lines 843 and 844 select the one pair of lines 852 which is concurrently being selected by the row select lines as previously discussed in connection with FIG. 6. Specifically, the decoder 892 selects that one of the line 852 which is the same row selected by the decoder 877 in connection with the gates 880 and 881.

In a similar manner, the decoder 892' also selects the row 852' which is the same row being selected by the decoder 877' in conjunction with the decoder 882 and the gates 880' and 881' in connection with FIG. 6. The data selected by the decoders 892 and 892' is sent and stored in the latches 894 and 894', respectively. Data is received at a time controlled by the STROBE signal on line 845 and simultaneously latched in the latches 894 and 894' by the same STROBE signal.

At a subsequent time, information is gated out from the latches 894 and 894' by receipt of the MPXR1 signal (either M1A or M1B, even or odd) at one time and by the MPXR2 signal (either M2C, or M2D, even or odd) on line 847 at a different time so that the information is output on a time multiplex basis on output line 836' under control of the multiplex signals on lines 846 and 847.

Figure 9:
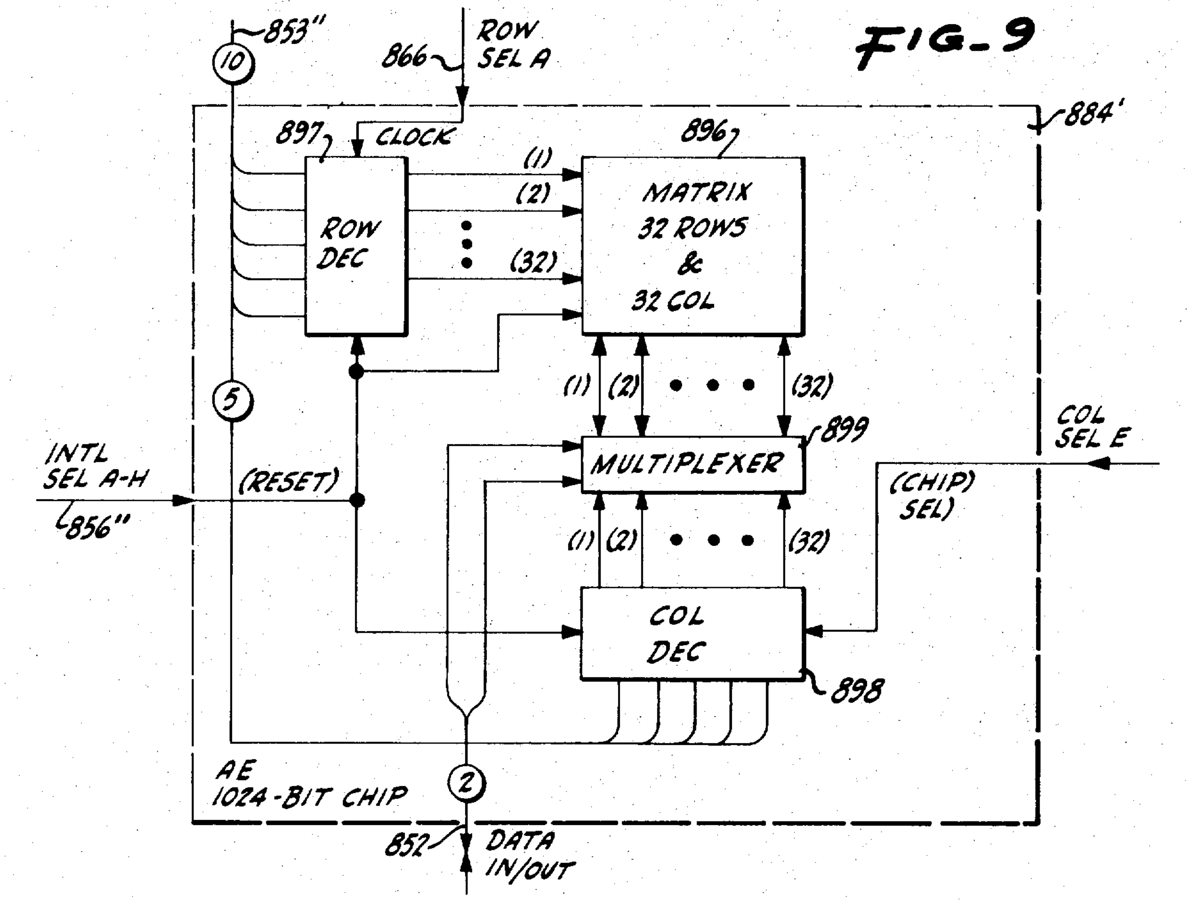
FIG. 9 depicts a block diagram of a 1024-bit chip typical of each of the 64 chips on the card of FIG. 5 and the array of FIG. 7.

1024-Bit Chip (FIG. 9)

Referring to FIG. 9, the details of a 1,024-bit chip 884 typical of all of the chips in the 64-chip array of FIG. 7 is depicted. As an aide in explanation, chip 884' in FIG. 9 represents the chip AE in FIG. 7. Chip 884' as shown in FIG. 9 receives the input 853'' which is derived from the address gate 854 on the chip card of FIG. 5. Similarly, chip 884' receives the ROW SEL A input of line 866 as depicted in the array 867. Also the chip of FIG. 9 receives the INTL SEL A–H signal on line 856'', the data in/out signal on line 852 and the COL SEL E signal 869.

The chip 884' includes a 5-bit row decoder 897 which receives 5 of the address bits on bus 853'' and decodes them to select 1 of 32 row lines which are input to the memory matrix 896. The row decoder 897 is responsive to a row selection signal (ROW SEL A) on line 866 and a reset pulse (INTL SEL A–H) on a line 856'' to select 1 out of 32 row lines designated by the five bits from the bus 853''.

In a similar manner, a column decoder 898 is responsive to the other five bits from the bus 853'' to select 1 out of 32 column lines input to the matrix 896 in response to a reset pulse (INTL SEL A–H) on the line 856'' and the column select signal (COL SEL E) on line 869. Depending upon the sequence of energization of the select lines 866, 856'' and 869, a single bit of data will be read into or read out from the matrix 896 on the dualphase data lines 852. The details of operation of the 1,024-bit chip like that of FIG. 9 are well known. Further specific details can be obtained from the reference entitled, "Product Specifications AMS, 1024 Bit High Speed MOS LSI Random Access AMS 6002" published by Advanced Memory Systems, Inc., Sunnyvale, Calif., January, 1973, No. 013-6002.1.

Figure 10:
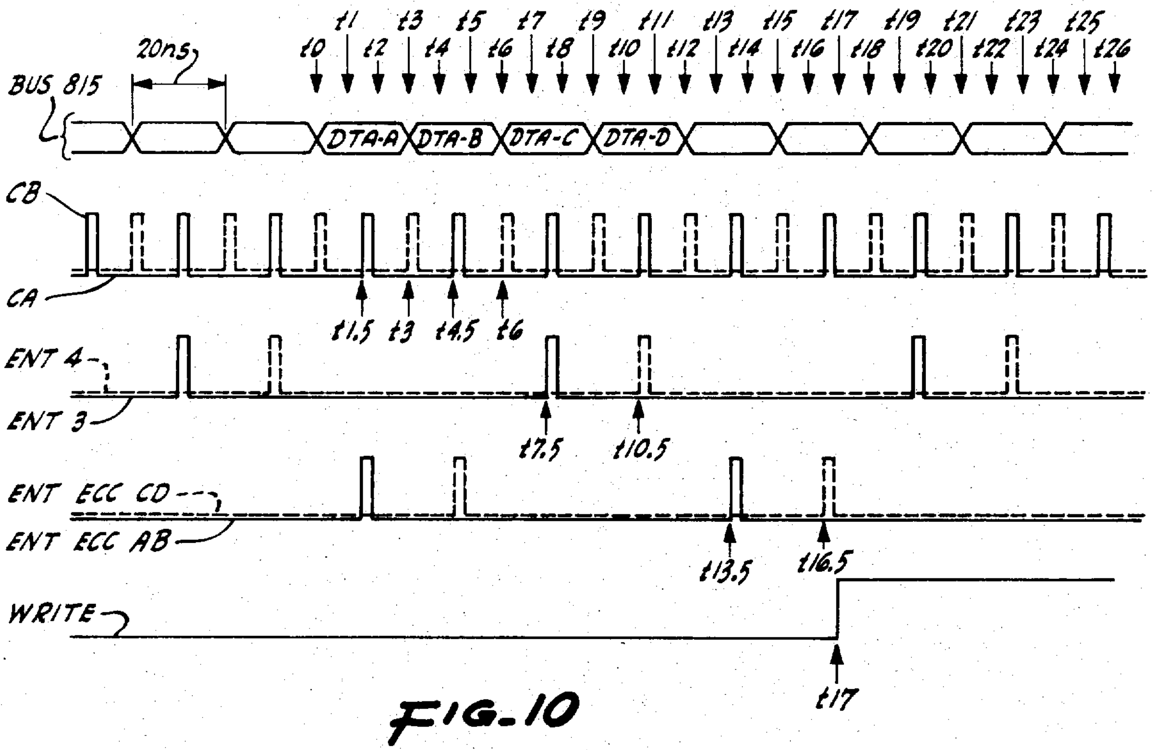
FIG. 10 depicts a schematic representation of waveforms descriptive of the write operation of the memory system of the present invention.

Write Operation (FIG. 10)

In FIG. 10, waveforms representative of the writing of data into the main store array 806 of FIG. 2 is shown. Referring to FIG. 2, information from the storage control unit 4 is transferred to the main store with new information every 20 nano-seconds over an 80 nano-second period every 160 nano-seconds. The basic cycle of the storage control unit and the data processing system of FIG. 1 is typically 20 nano-seconds. Data is transmitted every 20 nano-seconds on bus 808 and on bus 815 to the main store array 806 while address appear on bus 809 and bus 816 every 80 nano-seconds. Referring to FIG. 3, the 81 bits of information on bus 815 are stored with 64 bits of data in the registers 818 through 821 and with 9 bits of error-correcting information stored in registers 826 and 827 and with 8 bits of key information stored in register 828.

Referring to FIG. 10, the information at 20 nano-second intervals appearing on the bus 815 and lines 834 of FIG. 3 is depicted by the line designated BUS 815 in FIG. 10. At time *t*0 in FIG. 10, the 64 bits of information representing DTA A are first presented on bus 815. At time *t*1.5, the CA clock pulse in operative to latch the DTA A information into the register 818. One-half clock pulse period (10 nano-seconds) latter, the CB clock signal at *t*3 transfers the DTA A data in register 818 to register 819 in FIG. 3. At the same time, bus 815 acquires 64 new bits of data identified as DTA B. At time *t*4.5 in FIG. 10, the CA clock signal latches the data DTA B in register 818 while latching the data DTA A in register 820 which is output from the register 819. At *t*6 in FIG. 10, the CB clock pulse latches the DTA B data which is in register 818 into register 819 while the DTA A data which is in register 820 is latched into register 821. Also at *t*6, new data DTA C is presented on bus 815.

At *t*7.5 in FIG. 10, the ENT 3 control signal input to each of the registers 822, 823 and 824 is operative to store the data DTA A in register 822 output from the register 821, to store data DTA B in register 823 output from register 819 and to store data DTA C in register 824 as received from lines 834 and bus 815 directly. At *t*9 in FIG. 10, bus 815 is activated with new data DTA D which is stored at *t*10.5 by the signal ENT 4 in the register 825. At time 12 in FIG. 10, lines 834 of the bus 815 are free to again receive new data in the same manner as occured at *t*0. However, in a preferred embodiment, no new data is presented until after *t*24.

At time *t*12 in FIG. 10, bus 833 comprising the nine error-correcting bits associated with bus 815 is activated with the error-correcting code bits ECC AB which are latched into register 826 at *t*13.5 by the signal ENT ECC AB. At *t*15, the nine bits 833 of bus 815 are activated with the second set of error-correcting bits ECC CD which are latched into register 827 at time *t*16.5 by the signal ENT ECC CD. The key bits on bus 832 are latched into register 828 at times during which no write operation in being carried out and hence the timing of the ENT KEY ABCD signal which latches information into register 828 is not relevant to the waveforms of FIG. 10.

At a time approximately t17, the WRITE signal (see lines 842 in FIGS. 5, 6 and 8) is operative to store the data and error-correcting codes in the registers of FIG. 3 within the memory array of the data processing system provided the appropriate selection and address signals of FIG. 6 are properly generated. The generation of the selection and address signals is described now in connection with a read operation since the write operation selection and addressing is identical except for the presence or absence of the write signal on line 842.

Figure 11:
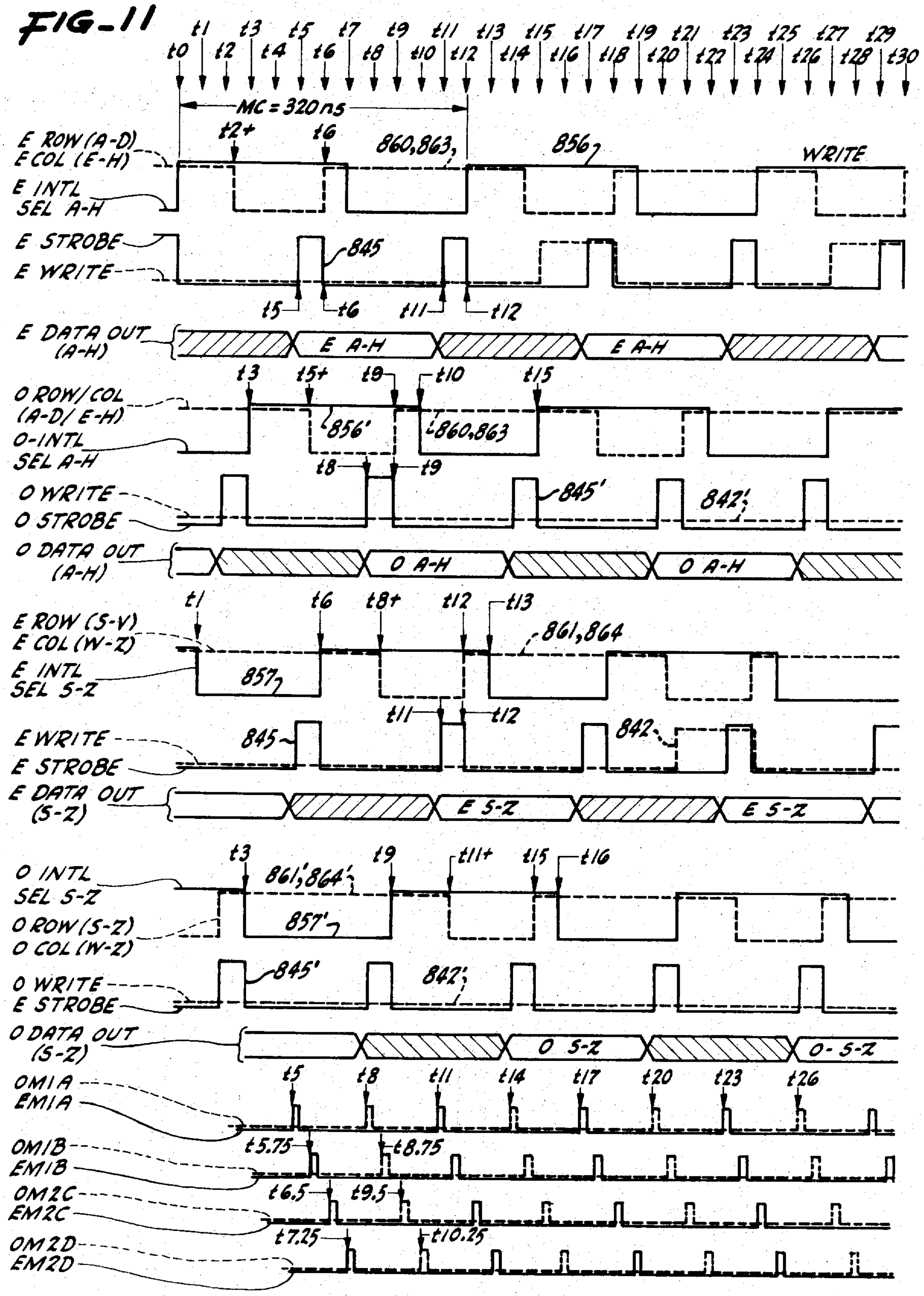
FIG. 11 depicts a schematic representation of waveforms descriptive of the read and write operation of the present invention.

Read Operation (FIG. 11)

Referring to FIG. 11, waveforms descriptive of the selection and address signals are shown which are used in connection with a read operation and also a write operation if a write pulse appears on line 842.

In FIG. 11, the basic memory cycle (MC) of the memory system is typically 320 nano-seconds as shown, for example, between the times *t*0 and *t*12 for the even interleave select line 856. Referring to FIG. 2 and FIG. 6, addresses on bus 809 are transmitted to the main store 2 from the storage control unit 4 every 80 nano-seconds. Those addresses appear on bus 816 as an input to the even or odd address registers 871 and 871', respectively, in alternate 80 nano-second time periods under control of timing lines 908 and 908' to the even and odd registers, respectively. The timing control signals on lines 908 and 908' (as well as the ENT and clock signals of FIG. 3) are derived from the timing control circuitry 910 in response to inputs from the timing circuitry of the storage control unit 4 on bus 905. The effect of the timing control lines 908 and 908' is to place a new address in each of the address registers 871 and 871' at 160 nano-second intervals corresponding to the presence of the addresses on bus 816. The addresses which appear every 80 nano-seconds correspond to four 64-bit groups of data DTA A, DTA B, DTA C, and DTA D shown, for example, between *t*0 and *t*2 in FIG. 10.

Still referring to FIG. 6, and assuming that at time *t*0 in FIG. 11 an address has been gated and latched into the even address register 871 by an appropriate pulse on line 908, the 10 low order address bits 11 through 20 are presented on the 10-bit output bus 853. Each one of those address bits is connected to each of the cards 830 in the even array of FIG. 4. Also at *t*0, the two high order bits 25 and 26 are output from register 871 forming an input to the decoder 882 which decodes the two bits to select one of the two outputs LMO or LM2 on lines 856 or 857, respectively. Assuming for purposes of explanation that the high order bits specify LM0, line 856 is energized to form the active state of the E INTL SEL A–H signal as shown in FIG. 11 for waveform 856 between *t*0 and *t*7. The presence of the high order bits in the register 871 and in the decoder 882 is maintained for approximately the period *t*0 to *t*7 which is 180 nano-seconds. The decoded bits 25 and 26 energize the LMO line 856 as described from *t*0 until *t*7.

After approximately 80 nano-seconds from *t*0 in FIG. 11, which is at time *t*3, bus 816 receives a new (second in this explanation) address. At about time *t*3, the bit 25 line 907 in FIG. 6 signals the timing control circuitry 910 to activate the odd control line 908' so as to latch the new address on bus 816 in the odd address register 871'. Assuming for purposes of explanation that the high order bits 25 and 26 placed in the address register 871' at t6 indicates that LM1 is to be energized, decoder 882' decodes the high order bits 25 and 26 to select LM1 by energizing line 856' with the signal O INTL SEL A–H which is in the active state between times *t*3 and *t*10 in FIG. 11. The address in register 871' is maintained until approximately time *t*10 when another address (fourth) is presented on bus 816 which is to be written into the odd address register 871' as determined by bit 25 connected to the timing control 910 the line 907.

Prior to time *t*10, however, an address (third) appears on bus 816 at about time *t*6 which under control of bit 25 on line 907 is stored in even address register 871. At about *t*6, that address (third) is presented to the address register 871 and is stored there producing the active state of the E INTL SEL S–Z signal. Address register 871 presents on its high order 2-bit output an input to the decoder 822 which is decoded at *t*6 to activate line 857 producing the signal E INTL SEL S–Z active between approximately *t*6 and *t*13. The next address (fourth) on bus 816 appears approximately 80 nano-seconds after the third address at *t*6 which is at *t*9 in FIG. 11. Bit 25 at the fourth address via line 907 energizes line 908' and latches the fourth address in the odd address register 871' at about *t*9. The high order 2 bits 25 and 26 are decoded by decoder 822' to energize the line 857' to form the signal O INTL SEL S–Z in the active state between about *t*9 and *t*16 as shown in FIG. 11.

A comparison of the interleave select line signals output from the odd and the even decoders 822 and 822' is seen by inspecting the waveforms 856, 856', 857 and 857' in FIG. 11. The even interleave select A–H waveform 856 is active during the period from *t*0 until *t*7. During this period from *t*0 to *t*7, the even interleave select S–Z waveform 857 is in the inactive state from *t*1 until *t*6. Similarly, during the period from t6 until t13 when the even interleave select S–Z waveform 857 is active, the even interleave select A–H waveform 856 is in the inactive state from the *t*7 until *t*12. The inactive state periods of the interleave select lines are the periods during which the MOS storage cell gating structures are being charged for operation. The active periods of the interleave select lines are the periods during which the MOS cells are accessed and the gating structures are therefore discharged. The active state periods of the A–H interleave select lines corresponds with the inactive state periods of the S–Z interleave select lines and vice-versa. In this manner, one group of memory chips are being charged while the other group are being accessed and discharged. The chips which were being charged thereafter come to the active state where they are accessed and discharged while the other chips which were previously being discharged are themselves charged in readiness for the next access and discharge.

While the above description was specifically directed to the even interleave select lines, the odd interleave select A–H and S–Z lines 856' and 857' are also active and inactive in opposite parts of the cycle. Specifically, the odd interleave select A–H line 856' is active from the period *t*3 until *t*10 while the odd interleave select line 857' is inactive from *t*3 until *t*9. When the odd interleaved select A–H line 856' is inactive from *t*10 until *t*15.

Each time the high order bits 25 and 26 in either the even address register 871 or 871' are decoded by the respective decoders 822 and 822', the row bits 21 and 22 and the column bits 23 and 24 are also input to decoders 877 and 876, respectively, for the even address register or 877' and 876', respectively, for the odd address register. Decoder 877 decodes the row address bits 21 and 22 to energize one of four output lines which are input in common to the AND gates 880 and 881. Gates 880 are selected whenever the interleaved select A–H line 856 is energized and gates 881 are selected whenever the interleaved select S–Z line 857 is energized. Consistent with the previous explanation, the line 856 is energized between *t*0 and *t*7 so that during this period the gates 880 are selected. Timing control line 912 from timing control circuitry 910, however, limits the duration of the selected output line from decoder 877 for a period which is approximately 90 nano-seconds from *t*2+ until *t*6. Accordingly, a particular one of the four row select lines 860 is energized from the period *t*2+ until *t*6.

At the same time that row decoder 877 is selecting one of the row select lines, column decoder 876 receives the bits 23 and 24 from the address register 871 providing inputs to the AND gates 878 and 879. As previously discussed, line 856 is active during the period from *t*0 until *t*7 so that, during this period, the gates 878 are the ones actually selected. Depending on bits 23 and 24, a particular one of the four column select line 863 is activated. The duration of the selection of the column select line is also under control of line 912 from timing control 910 so that the column select line is energized for the period from *t*2+ until *t*6.

In a fully analogous manner, during the period that the odd interleaved select A–H line 856' is activated, for example from *t*3 until *t*10, address bits 21 and 22 for the row and 23 and 24 for the column are output from the odd address register 871' to the decoders 877' and 876', respectively. During this period, those decoders function to select one of four outputs for a period controlled by timing line 912 from control 910 to select row and column select lines for the period from approximately *t*5+ until *t*9. Since line 856' is the one selected, the corresponding AND gates 878' and 880' are the ones selected so as to energize one of the four column select lines 863' and one of the four row select lines 860' for the period from *t*5+ until *t*9.

The operation of the row select and column select lines continues in the same manner for energization of the interleave select S–Z lines for both the even and odd arrays. Specifically, when the select line 857 is energized, gates 879 and 881 are selected and in accordance with the contents of the even address register 871, one out of the four column select lines 864 and one out of the four row select lines 861 are selected from a period from *t*8+ until *t*12 as shown in connection with waveforms 861 and 864 in FIG. 11. Similarly, during the energization of interleave select S–Z line 857', gates 879' and 881' are enabled so that one of the four column select lines 864' and one of the four row select lines 861' are energized during the period from *t*11+ until *t*15 as shown in FIG. 11 in connection with the waveform 861', 864'.

In addition to the output signals previously described, control 910 of FIG. 6 additionally generates an E STROBE signal on line 845, an E WRITE signal on line 842 and four E MPXR signals on the four lines 903. Similarly, the signals O MPXR, O WRITE and O STROBE are generated on the lines 903', 842' and 845', respectively.

Referring again to FIG. 11, the strobe signals 845 and 845' each occurs at approximatey a 160 nano-second frequency where the even strobe pulses 845 are shifted from the odd strobe pulses 845' by approximately 80 nano-seconds. The even strobe pulses occur at times when the even row and column select lines are energized. Specifically, the E STROBE signal shown by waveform 845 is active from *t*5 until *t*6 which is during the period that the row and column select lines are active from *t*2+ until *t*6. The E STROBE signal is again active from *t*11 until *t*12 which is the period again when the even row and column lines (S–V and U–Z) are active from *t*8+ until t12. In FIG. 11, the even strobe waveform 845 and the odd strobe waveform 845' are each shown twice for clarity in depicting their relationship to the other waveforms.

A data read operation is carried out in accordance with a memory system of the present invention by energization of an interleave select line, energization of a row select line, energization of a column select line, energization of a corresponding strobe pulse, and energization of the low order 10 chip address bits. Referring specifically to the typical chip of FIG. 9, the interleave select input 856'', the row select input 866, the column select 869, and the address bits 853'' are the signals required to present data out on the lines 852. The data on lines 852 is presented to the data in/out circuitry 848 of FIG. 5 and is latched there whenever a strobe pulse is presented on line 845.

Referring specifically to FIG. 11, the reading out of data for the even array of FIG. 4 commences by the energization of the row and column signals 860 and 863 between *t*2+ and *t*6 while the corresponding interleave select A–H waveform 856 is active between *t*0 and *t*7. For the purposes of the present example, it is assumed in FIG. 6 that the address bits 21 and 22 are decoded to specify row A and the column bits 23 and 24 are decoded to select column E. During the period from *t*2+ until *t*6, the interleave select A–H line 856 is active so that the chip, shown in FIG. 9, receives an interleave select input on line 856'', a row select input on line 866, and a column select input on line 869. The coincidence of these signals along with the 10 address bits on lines 853'' in FIG. 9 causes data to appear on lines 852. The data on lines 852 is transmitted to the receiver 892 (see FIG. 8) which receives input signals in the form of E SEL HI and E SEL LO on lines 843 and 844 which are bits 21 and 22 from the even address register 871 (see FIG. 6). These signals on lines 843 and 844 are decoded in the receiver circuitry 892 of FIG. 8 to select the lines 852 of the lines 851 which connect to the chip 884' (designated as chip AE in the upper half of chip array 850 of FIG. 7). Again referring to FIG. 7, it is apparent that there are two chips AE which are selected by the interleave select, row select and column select lines as previously indicated. One chip AE is in the upper half of array 850 and one chip AE is in the lower half of array 850. The chip AE in the lower half of the array 850 presents data out on line 852', as shown in FIG. 8, connected as an input to the receiver/decoder 892'. Receiver decoder 892' also receives the E SEL HI and E SEL LO signals on lines 843 and 844 which are also decoded to select lines 852'. The receivers in the receiver/decoders 892 and 892' of FIG. 8 are activated by the E STROBE pulse on line 845 (e.g. between *t*5 and *t*6 in FIG. 11). The data on lines 852 is transmitted to the L1 latch 894 while the data on lines 852' is transmitted to the L2 latch 894'. Latches 894 and 894' are both latched by the even strobe time, for example between *t*5 and *t*6 in FIG. 11.

Referring now to FIG. 5, each chip card is operative to latch two bits of data in the data in/out circuitry 848 each time a strobe pulse is presented on the line 845 provided all of the other inputs to the card have been appropriately established as previously discussed. Referring now to FIG. 4, it is apparent that two cards, like card 830 in FIG. 5, are associated with each position E0 through E63 of the even array and similarly two cards with each position O0 through O63. As previously discussed, each of the cards 830 in the even array and 831 in the odd array receives all of the row, column, interleave and strobe signals as previously discussed in connection with FIGS. 5 through 9. Also, as previously discussed, each strobe pulse is operative to latch two bits of data per card. Since there are 2 cards for each data position in the even array of FIG. 4, each even strobe pulse, like the pulse between t5 and t6 in waveform 845 of FIG. 10, is operative to latch four bits of data at a time for each of the 64 data positions E0 through E63 of FIG. 4. The cards 830 labelled A/C in FIG. 4 store 2 bits of data, 1 bit in each of the associated latch L1 and L2 designated as 894 and 894' in FIG. 8 for each card. In a similar manner, the cards 830 labelled B/D in FIG. 4 also stores two bits of data in the associated latches L1 and L2. The 4 bits of data, for each of the 64 data positions for the even array of FIG. 4 are represented by the waveform labelled E DATA OUT (A–H) in FIG. 11. Those four bits of data are latched between *t*5 and *t*6 and remain latched until the next even strobe pulse which occurs between *t*11 and *t*12. Four bits of data are latched between *t*5 and *t*6 in the even array for each of the locations E0 through E63 by the strobe pulse between T5 and T6 in FIG. 11 and therefor 256 bits of data are simultaneously latched in the even array of FIG. 4.

In a similar manner, the odd array of FIG. 4 comprising the cards 831 for the data locations O0 through O63 is operative to latch 256 bits of data between times *t*8 and *t*9 when the O STROBE pulse of waveform 845' of FIG. 11 is active while the appropriate row, column and interleave select signals are generated by the apparatus of the present invention as previously described.

Referring to FIG. 4, each pair of cards or each data position in the even and the odd array of FIG. 4 has its output data line connected in common with four other lines to form a DATA(*i*) output. For example, data line 836' from the A/C card 830 in the even array E0 position is connected with the output from the E0 B/D card and the outputs from the O0 A/C and B/D cards 831 to form the DATA(0) output line. Similar output lines DATA(1) through DATA(63) exist for the other data positions. Data is read out over the common data line DATA(0) for the four cards in the E0 and O0 positions of FIG. 4 using the time multiplex control signals which appear on the lines 903 for the even array and 903' for the odd array as derived from the timing control circuitry 910 in FIG. 6. The four timing signals for the multiplex lines 903 for the even array are EM1A, EM1B, EM2C, and EM2D. In a similar manner, the four timing signals for the odd array on lines 903' are OM1A, OM1B, OM2C and OM2D. The four signals prefixed with an E postscripted with the letters A, B, C and D are connected to the four half cards A, B, C and D in the even array. Similarly the four signals prefixed with an O and postscripted with the letters A, B, C and D are connected to the half cards A, B, C and D for the odd array. in FIG. 4, the time multiplex inputs have been shown only for the even and odd bit 0 positions but, of course, are connected as inputs to each of the other data positions 1 through 63.

Referring to FIG. 10, the even array time signals are shown as solid lines and the odd array timing signals are shown as broken lines. More specifically, the even array timing signals EM1A, which is derived from the timing control circuitry 910 of FIG. 6, is connected to the A inputs for cards 830 in FIG. 4 (shown specifically for the E0 position). The EM1A timing pulses occur at times *t*5, *t*11, *t*17, *t*23 and so forth. In a similar, the timing pulses EM1B, connected to the B half cards for the data positions B in the even array of FIG. 4 and have pulses which occur 20 nano-seconds after the EM1A pulses commencing at *t*5.75.

The EM2C pulses occur 20 nano-seconds after the EM1B pulses or, as shown in FIG. 11, commencing at time *t*6.5. Finally, the EM2D pulses occur 20 nano-seconds after the EM2C pulses commencing at *t*7.25 as shown in FIG. 10.

The EM1A signal and the EM2C signal connect to the lines 846 and 847, respectively, as shown in FIG. 5, for the A/C card 830 for each of the data positions E0 through E63 in FIG. 4. In a similar manner, the signals EM1B and EM2D connect to the lines 846 and 847, respectively, as shown in FIG. 5 for all of the B/D cards in the even array of FIG. 4. In a similar manner, the signals OM1A and OM2C connect to the lines 846 and 847 for the A/C cards in the odd array of FIG. 4 while the signals OM1B and OM2D connect to the multiplex lines 846 and 847 (see FIG. 5) for all of the B/D cards in the odd array of FIG. 4.

The four timing pulses EM1A, EM1B, EM2C and EM2D occur over the 80 nano-second period from *t*5 until *t*8. Each one of the timing signals has a 20 nano-second time slot for gating out the data stored in a respective four latches of the pair of cards in each data position. Accordingly, the 64 data lines DATA (0), DATA (1), . . . , DATA (63) are time multiplexed with 4 bits of data per line over the time period from *t*5 until *t*8 which represents a read out of the data in the even array of FIG. 4.

After completion of the read out of the even array, that is after completion of the pulse at *t*7.25 provided by the EM2B signal, the odd array is read out in an analogous manner by the four timing signals OM1A, OM1B, OM2C, and OM2D. Those odd array timing signals occur at 20 nano-second intervals shown, for example, in FIG. 11, at *t*8, *t*8.75, *t*9.5 and *t*10.25, respectively. Accordingly, during the 80 nano-second interval between *t*8 and *t*11, the data lines DATA (0), through DATA (63) are operative to time multiplex four bits of data per line representing a read out of the odd array of FIG. 4.

After completion of the read out of the odd array after the last pulse at *t*10.25 for the signal OM2D, the even array is again multiplexed with multiplex signals which commence at *t*11 and extend over the 80 nano-second period until *t*14. After completion of the even array read out, the odd array read out is again multiplexed over the next 80 nano-second period between *t*14 and *t*17. The even and odd array alternation continues in the manner indicated in FIG. 11.

While the invention has been particularly shown and described with reference to preferred embodiments thereof it will be understood by those skilled in the art that various changes in form and details may be made therein without departing from the spirit and the scope of the invention.

What is claimed is:

1. In a data processing system having a high-speed buffer store and one or more low-speed stores, the improved low-speed store comprising, a first array of integrated semi-conductor chips and a second array of integrated semi-conductor chips wherein said chips each contain storage locations and are energized during a charging period cyclically followed by deenergization during a discharging period and wherein information is read into or from addressed locations of accessed ones of said chips during said discharging period, addressing means connected in common to said chips in said first and second arrays for addressing in common locations of said chips in said first and second arrays, data access means connected in common to said chips in said first and second arrays for transmitting information between addressed locations of accessed ones of said chips and said buffer store, control means for accessing the chips of said first array on an interleaved basis with the chips of said second array whereby the chips in said first array are being charged when the chips in said second array one being discharged when the chips in said first array are being discharged when the chips said first array are being discharged.

2. In a data processing system having a high-speed buffer store and one or more low-speed stores, the improved low-speed store comprising, a plurality of semi-conductor chips each having a plurality of storage locations and each operable cyclically with a charging period during which no data may be accessed and with a data accessing period during which said chips are dischargeable, first selection means connected to a first number of said chips for selecting, when energized, a set of said first number of chips, second selection means connected to a second number of said chips where said second number of chips includes some of said first number of chips, for selecting, when energized, a set of said second number of chips which includes some of said first number of chips, third selection means connected to a third number of said chips where said third number of chips includes some of said first and second numbers of chips for selecting, when energized, a set of said third number of chips which includes some of said first and second numbers of chips, control means for energizing said first, second and third selection means whereby a group of said chips concurrently selected by said first, second and third selection means are accessed, data access means connected to said chips for transmitting information between accessed ones of said chips and said buffer store.

3. A data processing system including instruction and execution apparatus for processing information, and including storage apparatus for storing information to be processed by the instruction and execution apparatus where the storage apparatus includes a high-speed store and one or more low-speed stores, the improved low-speed store comprising, a plurality of semi-conductor chips wherein each chip includes a plurality of addressable storage locations addressed by low-order address bits, a first group of said chips connected in common for selection by first selection means, a second group of said chips connected in common for selection by second selection means, data accessing means connected in common to said chips in both said first and second groups for transferring data between addressed locations of selected chips and said high-speed store, addressing means having low-order bits connected to address said chips and having high-order bits connected to said first selection means for accessing the chips of said first group in one part of a periodic cycle and connected to said second selection means for accessing the chips of said second group in a second part of the periodic cycle whereby storage locations in said first and second groups are accessed on an interleaved basis.

4. The data processing system of claim 3 wherein said addressing means further includes address register means including means for connecting said low-order address bits from said register means to each of said chips in said first and second groups, and means responsive to said high-order bits for selecting chips in said first or said second groups.

5. The data processing system of claim 4 wherein each of said chips includes row select, column select, and interleave select inputs which are operative when simultaneously energized to select chips for accessing data, said first selection means including first row selection, column selection and interleave selection means connected to each of said chips in said first group and including means for simultaneously energizing said first row selection, column selection and interleave selection means, said second selection means including second row selection, column selection and interleave selection means connected to each of said chips in said second group and including means for simultaneously energizing said second row selection, column selection and interleave selection means, said addressing means further including a first decoder responsive to a field of bits in said address register means for controlling the selection of said first or said second selection means.

6. The data processing system of claim 5 wherein said first and said second groups of chips are organized into a plurality of rows and a plurality of columns and wherein said addressing means further includes decoders responsive to a field of bits in said addressing means for selecting one of said rows and a decoder responsive to a field in said addressing register means for selecting one of said columns.

7. A data processing system including instruction and execution apparatus for processing information, and including storage apparatus for storing information to be processed by the instruction and execution apparatus where the storage apparatus includes a high-speed store and one or more low-speed store comprising, first and second arrays, each array including a plurality of semiconductor chips wherein each chip includes a plurality of addressable storage locations and is operable cyclically over a first non-accessable period and over a second accessable period, each of said arrays further including, first selection means connecting a first group of said chips in common for accessing said first group of chips, second selection means connecting a second group of said chips in common for accessing said second group of chips, data accessing means connected in common to chips in both said first and second groups, for transferring information between addressed locations of accessed ones of said chips and said high-store, addressing means having a first field of bits connected to address said addressable storage locations, having a second field of bits, having means connecting said second field of bits to said first selection means to access the chips of said first group in one part of a periodic cycle, and having means connecting said second field of bits to said second selection means to access the chips of said second group in a second part of a periodic cycle whereby information bits in said first and second groups are accessed on an interleaved basis.

8. The data processing system of claim 7 wherein said data accessing means includes multiplexing means for time multiplexing data output from the chips in said first array alternately with time multiplexing data output from chips in said second array.

9. The data processing system of claim 7 wherein said addressing means further includes address register means connecting said first field of bits to each of said chips in said first and second groups in each of said arrays, and means responsive to said second field of bits for selecting chips in said first or second groups.

10. The data processing system of claim 7 wherein each of said chips includes row select, column select, and interleave select inptus which are operative when simultaneously energized to select the associated chip for accessing information, and wherein said first selection means and said second selection means for each of said arrays includes row selection, column selection, and interleave selection means connected to the row select, column select and interleave select inputs for each of said chips in said first and said second groups, respectively, and includes means for simultaneously energizing said row selection, column selection, and interleave selection means and wherein said addressing means further includes a first decoder responsive to said second field of bits in said address register means for controlling the selection of said first and second selection means.

11. The data processing system of claim 7 wherein said first and said second groups of chips in each array are organized into a plurality of rows and a plurality of columns and wherein said addressing means further includes row decoder means responsive said second field of bits for selecting one of said rows and a column decoder means responsive to said second field of bits for selecting one of said columns.

12. The data processing system of claim 8 wherein said multiplexing means includes means for time multiplexing data from said chips at a frequency approximately 1/16 the frequency defined by said first and second periods.

13. The data processing system of claim 7 wherein said first and second second groups of chips in each array are organized into a plurality of rows and a plurality of columns, wherein said rows are further divided into two groups and said columns are further divided into two grups, wherein said addressing means includes a third field of bits, wherein said addressing means includes interleave selection means responsive to said third field of bits to alternately select one or the other of said groups of rows and said groups of columns, wherein said addressing means further includes row decoder means responsive to said second field of bits for selecting one of said rows and a column decoder means responsive to said second field of bits or selecting one of said columns.

14. In a data processing system having a buffer store and a main storage system system for transmitting information to and from the buffer store, the improved main storage system comprising, first and second arrays each including a plurality of integrated semi-conductor chips on a plurality of cards where each chip includes a plurality of addressable storage locations, addressing means connected in common to said chips for addressing said storage locations in common, data access means connected in common to said chips to transfer information between addressed locations of accessed ones of said chips and said buffer store, control means for accessing the chips of said first array on an interleaved basis with the chips of said second array whereby data is accessed on an interleaved basis.

15. In a data processing system having means for generating high-order and low-order address bits and having a main storage apparatus including a first group of semi-conductor chips and a second group of semi-conductor chips wherein said chips include storage locations and are energized during a charging period cyclicly followed by deenergization during a discharging period and wherein information is read into or from locations in said chips addressed by said low-order address bits during the discharging period, the method comprising the sequential steps of, accessing the chips of said first group during the first group discharging period while the chips of said second group are in a charging period, accessing the chips of said second group during the second group discharging period while the chips of said first group are in a charging period.

16. The method of claim 15 further comprising the steps of time multiplexing information from or to the chips of said first group when the chips of said first group are accessed and time multiplexing information from or to the chips of said second group when the chips of said second group are accessed.

* * * * *

PO-1050
(5/69)

UNITED STATES PATENT OFFICE
CERTIFICATE OF CORRECTION

Patent No. 3,866,180 Dated February 24, 1975

Inventor(s) E. Leon Willette

It is certified that error appears in the above-identified patent and that said Letters Patent are hereby corrected as shown below:

IN THE CLAIMS:

Claim 1, column 18, line 10, after "chips" insert --in--.

Claim 7, column 19, line 60, after "high-" insert --speed--.

Claim 10, column 20, line 18, cancel "inptus" and substitute therefor --inputs--.

Claim 10, column 20, line 31, after "and" insert --said--.

Claim 11, column 20, line 37, after "responsive" insert --to--.

Claim 13, column 20, line 47, after "and" cancel "second" and substitute therefor --said--.

Claim 13, column 20, line 51, cancel "grups" and substitute therefor --groups--.

Claim 13, column 20, line 59, after "bits" cancel "or" and substitute therefor --for--.

Signed and sealed this 20th day of May 1975.

(SEAL)
Attest:

RUTH C. MASON
Attesting Officer

C. MARSHALL DANN
Commissioner of Patents
and Trademarks

UNITED STATES PATENT AND TRADEMARK OFFICE
CERTIFICATE OF CORRECTION

PATENT NO. : 3,866,180

DATED : February 11, 1975

INVENTOR(S) : E. Leon Willette

It is certified that error appears in the above-identified patent and that said Letters Patent are hereby corrected as shown below:

IN THE TITLE:

Delete "HAVING AN INSTRUCTION PIPELINE FOR CONCURRENTLY PROCESSING A PLURALITY OF INSTRUCTIONS and substitute therefor -- INTERLEAVED MAIN STORAGE AND DATA PROCESSING SYSTEM --.

Signed and Sealed this

Third Day of May 1977

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,866,180

DATED : February 11, 1975

INVENTOR(S) : E. Leon Willette

It is certified that error appears in the above-identified patent and that said Letters Patent are hereby corrected as shown below:

IN THE CLAIMS:

Claim 1, column 18, line 9, between "array" and "being", delete "one" and substitute therefor--are--.

Claim 1, column 18, line 9, between "discharge" and "the", delete "when" and substitute therefor--and wherein--.

Claim 1, column 18, line 11, after "being", delete "discharged" and substitute therefor--charged--.

Claim 7, column 19, line 44, between "low-speed" and "store", insert--stores, the improved low-speed--.

Signed and Sealed this

*Second* Day of *May 1978*

[SEAL]

*Attest:*

RUTH C. MASON
*Attesting Officer*

LUTRELLE F. PARKER
*Acting Commissioner of Patents and Trademarks*